US012780610B2

(12) United States Patent
Zanella et al.

(10) Patent No.: US 12,780,610 B2
(45) Date of Patent: Nov. 3, 2026

(54) COUPLING AND LOCKING ASSEMBLY FOR SYNCHRONOUS DOORS OF AN ELEVATOR EQUIPMENT

(71) Applicant: PRISMA S.P.A., Sorbolo Mezzani (IT)

(72) Inventors: Antonio Zanella, Parma (IT); Amardeep Singh, Dosolo (IT); Maurizio Farina, Colorno (IT)

(73) Assignee: PRISMA S.P.A., Sorbolo Mezzani (IT)

( * ) Notice: Subject to any disclaimer, the term of this patent is extended or adjusted under 35 U.S.C. 154(b) by 0 days.

(21) Appl. No.: 19/259,382

(22) Filed: Jul. 3, 2025

(65) Prior Publication Data

US 2026/0008653 A1 Jan. 8, 2026

(30) Foreign Application Priority Data

Jul. 8, 2024 (IT) ........................ 102024000015724

(51) Int. Cl.
*B66B 13/12* (2006.01)

(52) U.S. Cl.
CPC .................................... *B66B 13/12* (2013.01)

(58) Field of Classification Search
CPC ................................ B66B 13/12; B66B 13/20
See application file for complete search history.

(56) References Cited

U.S. PATENT DOCUMENTS 11,286,134 B2 * 3/2022 Montigny ............... B66B 13/18

FOREIGN PATENT DOCUMENTS

DE 202014102533 U1 * 8/2015 ............. B66B 13/20
EP 1713712 B9 11/2009
EP 2287104 B1 8/2013
ES 1057054 U 6/2004

OTHER PUBLICATIONS

Machine Translation of EP 2287104.*
Italian Search Report from Corresponding Italian Patent Application No. 202400015724, dated Jan. 8, 2025.

* cited by examiner

*Primary Examiner* — Diem M Tran
(74) *Attorney, Agent, or Firm* — Cooper Legal Group LLC

(57) ABSTRACT

A coupling and locking assembly for synchronous doors of elevator equipment. The assembly includes a coupling and locking device mounted to a guide element by a fastening system having a plurality of holes spaced from each other. The coupling and locking device includes a base plate, a pair of coupling blades and a pair of rotating articulated levers. Movable pins integral with the articulated levers are configured to fit into slots in the coupling blades. At least one part of the slots is provided with teeth which extend inside the respective slot such that the slot has a sawtooth shape to define a plurality of discrete seats into which respective movable pins may be introduced, thereby providing the coupling blades with a corresponding plurality of different mounting configurations relative to the articulated levers. The coupling blades and the articulated levers may be constructed according to one of three different profiles.

9 Claims, 4 Drawing Sheets

COUPLING AND LOCKING ASSEMBLY FOR SYNCHRONOUS DOORS OF AN ELEVATOR EQUIPMENT

CROSS-REFERENCE TO RELATED APPLICATION(S)

This application claims priority under 35 U.S.C. § 119 to: Italian Patent Application No.: 102024000015724, filed on 8 Jul. 2024, which is herein incorporated by reference.

BACKGROUND

The present invention generally relates to the technical field of the elevator equipment, such as lifts/elevators or freight elevators. In particular, the present invention relates to a coupling and locking assembly for synchronous doors of an elevator equipment.

Elevator equipment according to the prior art comprise a cab which is movable inside a shaft commonly called “elevator shaft”. The cab, conventionally moved by ropes or hydraulic pistons, connects at least two distinct floors of the same building to each other. A so-called “landing door” which restricts access to the elevator equipment shaft is provided for each floor of the building. The cab is also equipped with a so-called “cab door”, which normally consists of at least one panel sliding on guides. The panels sliding on their respective guides allows the cab door to be opened and closed.

In the most recent elevator equipment, both the cab door and the various landing doors are generally automatically and synchronously opened and/or closed. Apart from the cab door, in fact, each landing door also usually consists of at least one panel which slides on guides. Consequently, during normal operation of the elevator equipment, the sliding movement of the cab door panels during the opening and closing phases is synchronised with the sliding movement, during the same phases, of the panels of the door of the floor at which the cab is located. This synchronous movement allows the door of each floor to open automatically when the cab door opens when both these doors are aligned.

In case of malfunctions of the elevator equipment or when unexpected situations, such as a power outage, occur, the cab could suddenly stop between two distinct floors of the building. In this situation the cab door, because it is not aligned with any of the landing doors, obviously does not allow the automatic and synchronous opening of these landing doors which are therefore locked in the closed position.

The current European standards for the design and production of elevator equipment (EN 81-20 and EN 81-50 standards) require that the cab door be equipped with at least one device designed to both allow coupling with the landing doors in the aligned configuration and blocking the cab door in the misaligned configuration. In particular, in this latter configuration, the device interacts with the cab door to prevent the panels of such door from being opened manually, from the interior of the cab, when the cab door and the landing doors are not aligned. This requirement has been introduced to prevent the passengers who are inside the cab from accidentally falling into the elevator shaft when attempting to escape from the cab.

In Europe, there are countless different solutions for synchronous doors for elevator equipment. These synchronous cab and landing doors have been sold on the various European markets since the 1970s and are still largely in operation. Consequently, there are many coupling and locking assemblies for these synchronous doors, especially for the cab doors, still in operation. Typically, these coupling and locking assemblies have also been modified and customized by the installers over time. When one of these coupling and locking assemblies breaks and specific spare parts are not available, for example because they are no longer in production due to the age of the elevator equipment, installers are forced to adapt new spare parts, perhaps standardized, to coupling measures that are however non-standard.

To solve the above-mentioned drawback, companies producing components for elevator equipment generally offer for sale coupling and locking assemblies which are customized, that is to say adapted to most of the different elevator equipment that are currently in operation. These customized coupling and locking assemblies guarantee the effective operation of the elevator equipment but at the expense of standardization, with negative consequences, in terms of time and costs, on industrial processes. On the contrary, the current standardized coupling and locking assemblies, although simpler and cheaper to manufacture, often involve problems of adaptability to specific elevator equipment, with negative consequences on their effective operation.

A coupling and locking assembly for synchronous doors of an elevator equipment according to the prior art is disclosed, for example, in document ES 1057054 U, on which the preamble of claim 1 is based.

The object of the present invention is, therefore, to provide a coupling and locking assembly for synchronous doors of an elevator equipment which is capable of solving the aforementioned drawbacks of the prior art in an extremely simple and particularly functional way.

In detail, it is an object of the present invention to provide a coupling and locking assembly for synchronous doors of an elevator equipment which allows it to be adapted to numerous elevator equipment which are currently in operation, although it can be manufactured in a standardized way.

Another object of the present invention is to provide a coupling and locking assembly for synchronous doors of an elevator equipment which allows for greater precision and stability of operation compared to known coupling and locking assemblies.

These and other objects according to the present invention will be achieved by providing a coupling and locking assembly for synchronous doors of an elevator equipment as set forth in claim 1.

Further features of the invention are highlighted by the dependent claims, which are an integral part of the present description.

BRIEF DESCRIPTION OF THE DRAWINGS

The features and advantages of a coupling and locking assembly according to the present invention for the synchronous doors of an elevator equipment will be clearer from the following exemplifying and non-limiting description, referring to the attached schematic drawings in which.

DETAILED DESCRIPTION

With reference to the Figures, a preferred embodiment of the coupling and locking assembly according to the present invention for the synchronous doors of an elevator equipment is shown. The coupling and locking assembly is indicated as a whole with the reference number 10. Compared to the similar technical solutions of the prior art, which are usually designed to be mounted on specific elevator equipment, or in any case on elevator equipment belonging to limited families, the coupling and locking assembly 10 is capable to be adapted to numerous different elevator equipment, despite requiring a limited number of specific components.

Figure 2:
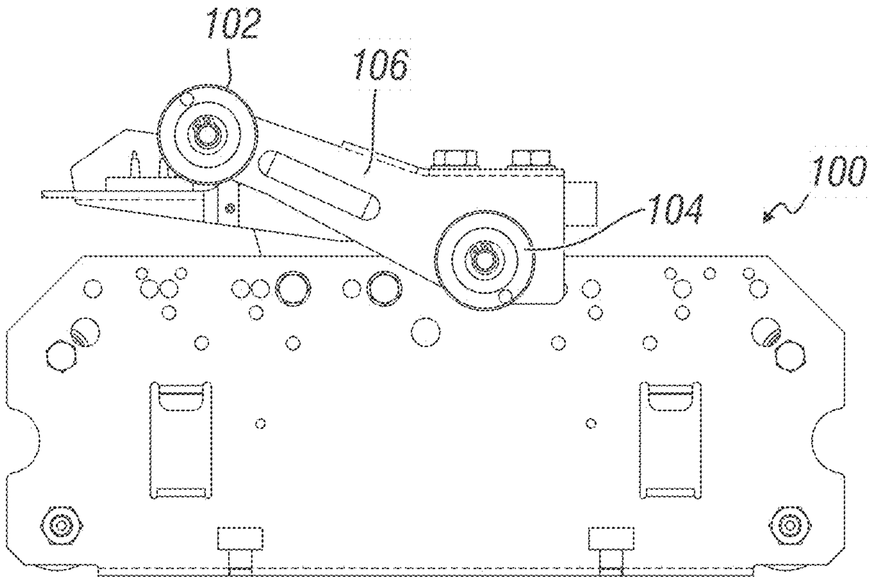
FIG. 2 is a side elevation view of a locking/unlocking device for the landing doors of an elevator equipment, with which the coupling and locking assembly according to the present invention can interact.

The coupling and locking assembly 10 in fact consists of a kit of components which are standardized but designed to be adapted to different types of cab and/or landing doors of an elevator equipment, keeping the landing doors with their respective locking/unlocking devices unchanged. One of these locking/unlocking devices for the landing doors is shown in FIG. 2 and is indicated with the reference number 100. The locking/unlocking device 100 in FIG. 2 comprises, in a per se known manner, two rollers 102 and 104 integral with a lever 106.

Figure 1:
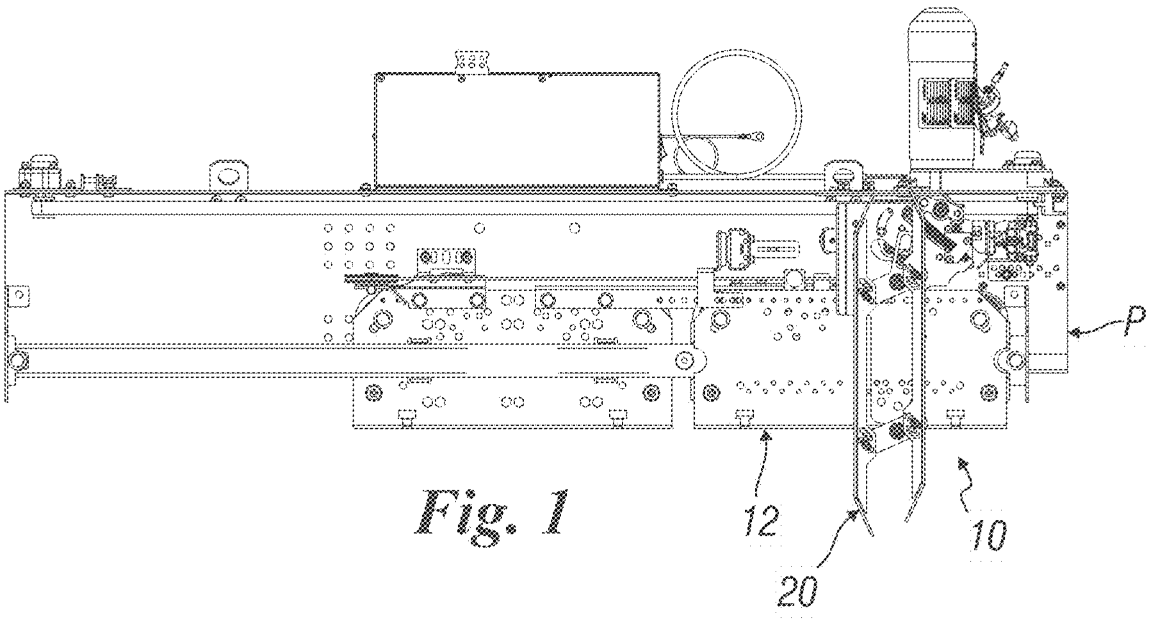
FIG. 1 is a side elevation view of a coupling and locking assembly according to the present invention for the synchronous doors of an elevator equipment, wherein the coupling and locking assembly is shown in a configuration installed on a generic cab door opening/closing mechanism.
Figure 3:
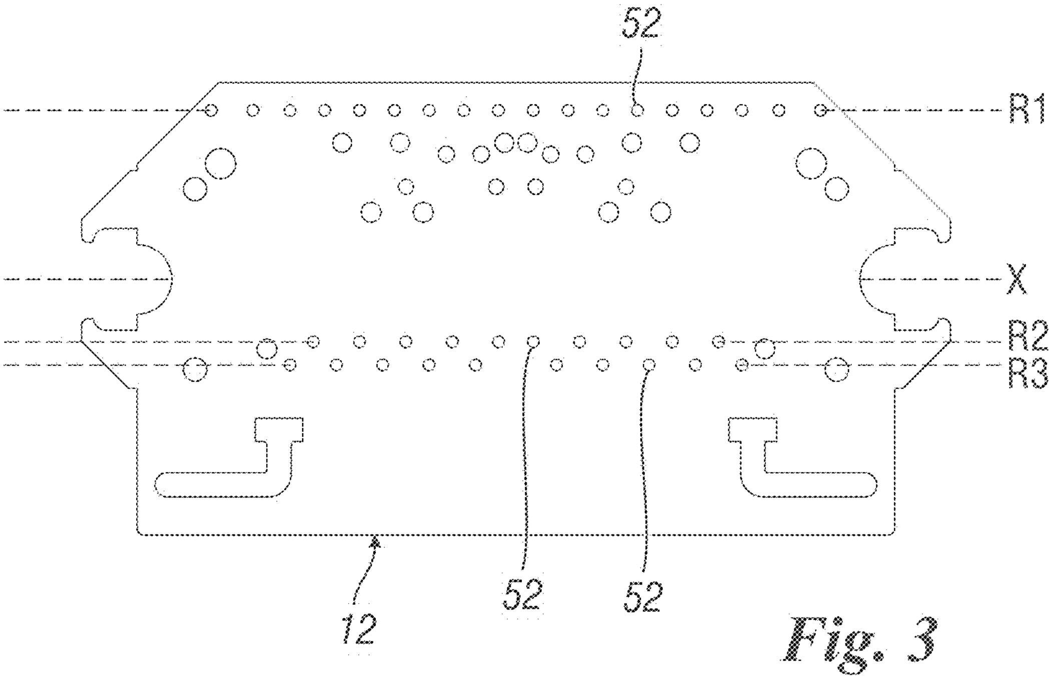
FIG. 3 is a side elevation view of a preferred embodiment of a guide element belonging to the coupling and locking assembly of the present invention.
Figure 4:
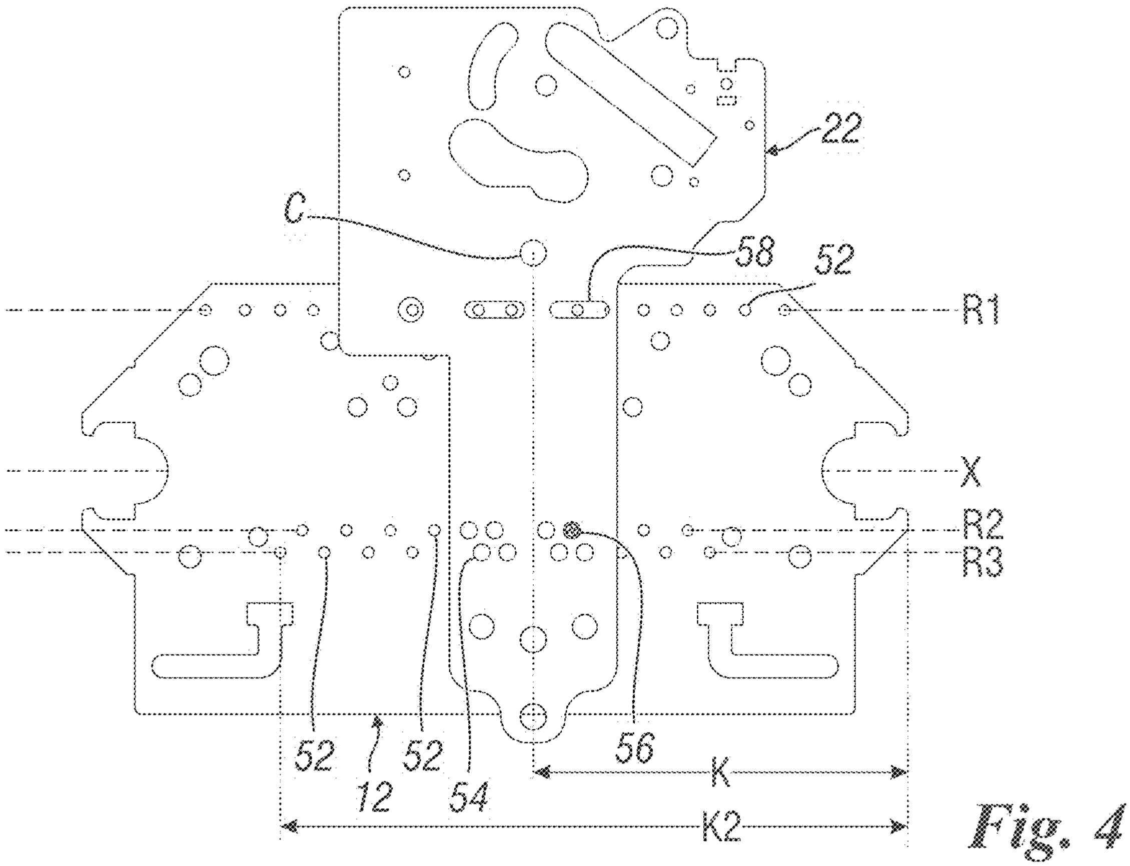
FIG. 4 is a side elevation view of the guide element in FIG. 3, on which the base plate of a coupling device belonging to the coupling and locking assembly according to the present invention is mounted.

The coupling and locking assembly 10 comprises at least one plate-shaped guide element 12, shown in FIGS. 3 and 4. The guide element 12 is designed to be fixedly mounted on a portion P of a cab of the elevator equipment, as shown for example in FIG. 1.

Figure 5:
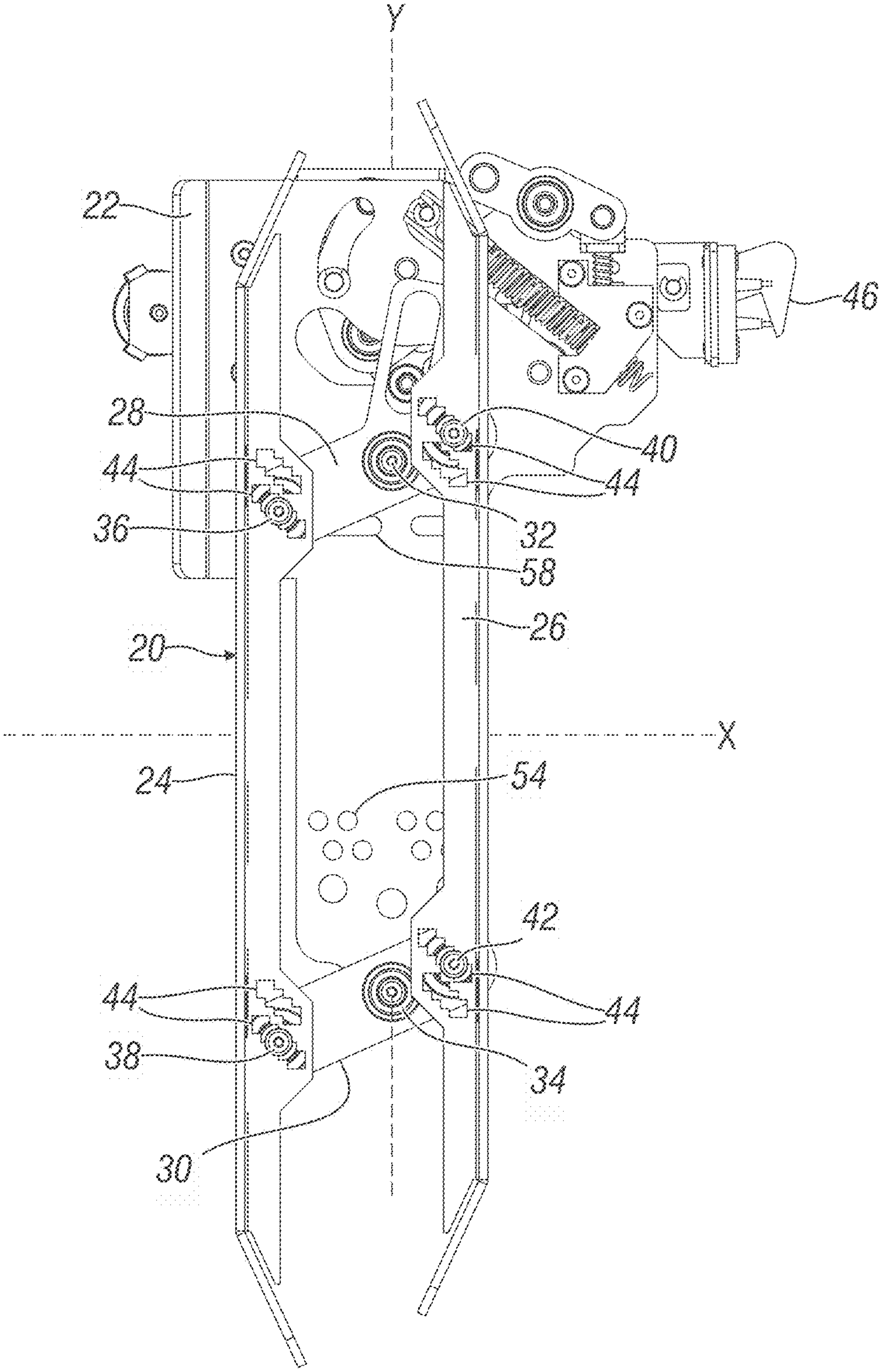
FIG. 5 is a side elevation view of a coupling device belonging to the coupling and locking assembly according to the present invention.

The coupling and locking assembly 10 further comprises at least one coupling and locking device 20, shown in FIG. 5. The coupling and locking device 20 is designed to be mounted on the guide element 12 by means of a fastening system, which will be described in details below.

The coupling and locking device 20 comprises a base plate 22 and a pair of coupling blades 24, 26, which are also known as "swords". These coupling blades 24, 26 are movably mounted on the base plate 22 and can be operated by a respective actuator of the elevator equipment to be moved along predefined movement directions. The actuators of the elevator equipment which operate the coupling blades 24, 26 can be formed, for example and in a per se known manner, by the rollers 102 and 104 of the locking/unlocking device which is located at a certain landing door.

The coupling and locking device 20 further comprises a pair of articulated levers 28, 30, which are both rotatable around respective fixed pins 32, 34 placed on the base plate 22. The articulated levers 28, 30 are hinged to the coupling blades 24, 26 by means of respective movable pins 36, 38, 40, 42, to form a parallelogram mechanism consisting of the two coupling blades 24, 26 and the two articulated levers 28, 30. The movable pins 36, 38, 40, 42 are integral with the articulated levers 28, 30 and are designed to fit into respective slots 44 obtained on the coupling blades 24, 26.

At least one hooking lever 46, which is movable relative to the base plate 22 and is designed to selectively engage/disengage with a respective fixed component of the elevator equipment according to the position taken by the coupling blades 24, 26 is also provided on the coupling and locking device 20. This fixed component of the elevator equipment can consist, for example, of a hook attached to the cab.

Advantageously, at least one part of the slots 44 of the coupling blades 24, 26 is provided with a plurality of teeth 48 which extend inside the respective slot 44, in such a way that each slot 44 has a sawtooth shape. This sawtooth shape defines a plurality of discrete seats into which respective movable pins 36, 38, 40, 42 of the articulated levers 28, 30 can be introduced. A plurality of different mounting configurations of the coupling blades 24, 26 can be thereby obtained in comparison with to the articulated levers 28, 30, according to the position of the movable pins 36, 38, 40, 42 into the various predetermined seats obtained in each slot 44.

Figure 7:
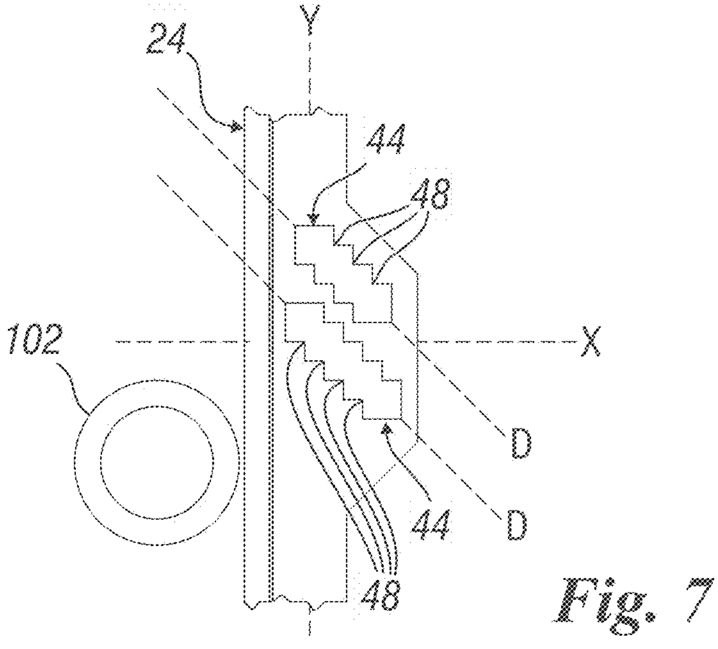
FIG. 7 is an enlarged view of a portion of one of the coupling blades, shown while interacting with a roller of the landing door locking/unlocking device in FIG. 2.

Preferably, as shown in the detail view in FIG. 7, each slot 44 can be oriented along an extension direction D which is oblique relatively to both a substantially vertical direction Y, which coincides with the extension direction of the corresponding coupling blade 24, 26, and a substantially horizontal direction X, which is perpendicular to the substantially vertical direction Y. More preferably, the extension direction D of each slot 44 is inclined at 45° relatively to both the substantially vertical direction Y and the substantially horizontal direction X.

Figure 6:
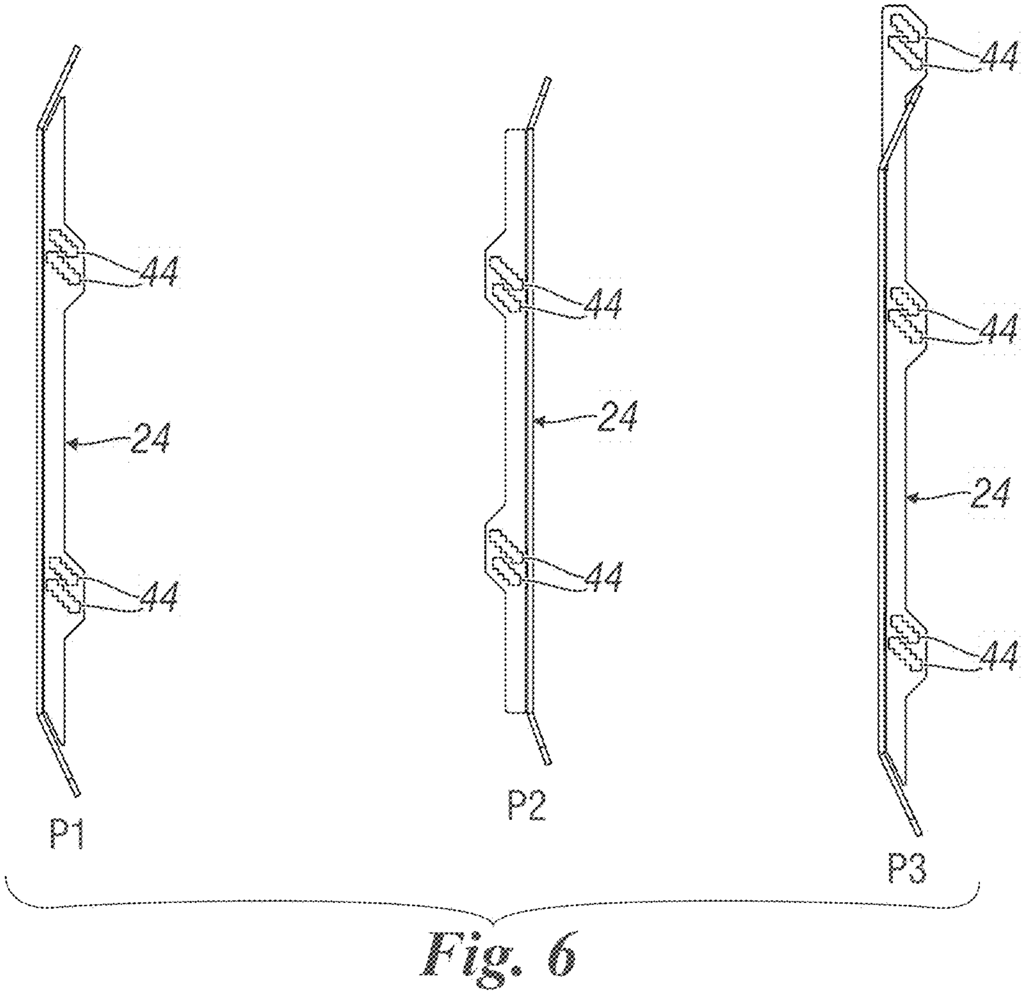
FIG. 6 shows three different profiles of the coupling blades, which are also known as "swords", of the coupling device in FIG. 5.

As shown in FIG. 6, the coupling blades 24, 26 can be suitably manufactured according to at least three different profiles, indicated with P1, P2 and P3. Each profile P1, P2, P3 of a respective coupling blade 24, 26 can differ from the other profiles P1, P2, P3, for example in at least one of the following technical features:

- the length of the coupling blade 24, 26 along the respective extension direction Y;
- the number of the respective slots 44;
- the position of the respective slots 44;
- the width of the coupling blade 24, 26 along a direction X perpendicular to the respective extension direction.

The working area of each coupling blade 24, 26 can be in this way adjusted both along the substantially horizontal direction X and along the substantially vertical direction Y. In particular, the working area can be adjusted very accurately along the substantially horizontal direction X thanks to the particular sawtooth shape and the positioning of the various toothed slots 44.

The articulated levers 28, 30 can also be suitably manufactured according to at least three different profiles, not shown in the Figures. Different values of both static position, in the cab door opening or closing configurations, and of the coupling blades 24, 26 excursion can be thereby obtained.

As shown in the embodiment in FIGS. 6 and 7, each coupling blade 24, 26 can be provided with one or more pairs of slots 44 parallel and close to each other. Each of these pairs of slots 44 is designed to accommodate the same movable pin 36, 38, 40, 42 in the different mounting configurations of the coupling blades 24, 26 relative to the articulated lever 28, 30. The discrete seats which are obtained on each respective slot 44 can be thereby spaced apart from each other at a pitch of 1.5 mm. In other words, using alternatively the seats obtained on the upper slot and on the lower slot of each pair of slots 44, each coupling blade 24, 26 can be positioned at pitches of 1.5 mm. This value has been calculated in such a way that the interaction of the coupling blades 24, 26 with the rollers 102 and 104 of the different landing doors is optimized.

As shown in FIGS. 3 and 4, the fastening system between the coupling and locking device 20 and the respective guide element 12 comprises:

- a first plurality of circular through holes 52 obtained on the guide element 12;
- a second plurality of circular through holes 54 obtained on the base plate 22 of the coupling and locking device 20; and
- a plurality of fastening means 56, for example a plurality of bushes, wherein each fastening means 56 is designed to be inserted into one single circular through hole 52 of the guide element 12 and into a corresponding single circular through hole 54 of the base plate 22.

Advantageously, both the circular through holes 52 of the guide element 12 and the circular through holes 54 of the base plate 22 are respectively spaced apart from each other at a predefined pitch. Moreover, the circular through holes 52 of the guide element 12 are arranged in at least three rows R1, R2, R3 which are parallel to each other and oriented along the substantially horizontal direction X.

Preferably, the rows of circular through holes 52 comprise an upper row R1 and a pair of lower rows R2 and R3. The circular through holes 52 that are arranged in the same lower row R2 and R3 can be spaced apart from each other at a pitch of about 10 mm along the substantially horizontal direction X. Additionally, the circular through holes 52 that are arranged in a first lower row R2 are staggered by 5 mm, again along the substantially horizontal direction X, relatively to the holes 52 that are arranged in a second lower row R2. This particular arrangement of the circular through holes 52 of the guide element 12 allows the base plate 22 of the coupling and locking device 20 to be fixed, with reference on one side to its own centre of gravity C and on the other side to an end edge of the guide element 12, at distances K varying between a minimum value of approximately 50 mm and a maximum value K2 limited only by the length of the guide element 12.

The fastening system between the coupling and locking device 20 and the respective guide element 12 can also comprise a plurality of elliptical through holes 58 obtained on the base plate 22 of the coupling and locking device 20. These elliptical through holes 58 overlap with the circular through holes 52 of the guide element 12 which are arranged in the upper row R1 when the coupling and locking device 20 is mounted on the guide element 12.

It has thus been seen that the coupling and locking assembly according to the present invention for the synchronous doors of an elevator equipment achieves the objects highlighted above, obtaining in particular the following advantages:

- effectiveness of the cab and landing doors locking/unlocking operations, thanks to the specific characteristics of the coupling and locking device;
- use of a limited number of standardized components to cover the most common cab and landing door systems, at least among those dating back to the 1980s-1990s and to the 2000s, and consequent rapid replacement of obsolete mechanisms with operating problems which would compromise the use of the elevator system. In fact, the negative consequences of a system shutdown, for example, of an elevator installed in a residential building with many floors are well known;
- stability of operation, since the coupling and locking assembly of the present invention is based on discrete, that is to say not continuous adjustments. The positions established during assembly, by assembling the standardized components, are maintained because fixed positions have been created with bushings mounted inside circular holes and sawtooth-shaped slots, but not only inside internally smooth slots;
- accuracy of adjustments, since the coupling blades or swords have the possibility of moving with very small intervals.

The coupling and locking assembly for synchronous doors of an elevator equipment of the present invention thus conceived is however susceptible of numerous modifications and variations, all of which falling within the scope of the attached claims; furthermore, all the details can be replaced by technically equivalent elements. In practice, the materials used, as well as the shapes and dimensions, may be any according to the technical requirements.

The scope of protection of the invention is therefore defined by the attached claims.

The invention claimed is:

1. A coupling and locking assembly for synchronous doors of an elevator equipment, the assembly comprising:

- at least one plate-shaped guide element, which is configured to be fixedly mounted on a portion (P) of a cab of the elevator equipment; and
- at least one coupling and locking device, which is configured to be mounted on said guide element by a fastening system, the coupling and locking device comprising:
  - a base plate;
  - a pair of coupling blades mounted on the base plate to be movable along predefined movement directions by a respective actuator of the elevator equipment;
  - a pair of articulated levers, which are both rotatable around respective fixed pins on the base plate, wherein said articulated levers are hinged to the coupling blades, by respective movable pins, to form a parallelogram mechanism comprising said coupling blades and said articulated levers, and wherein said movable pins are integral with said articulated levers; and
  - at least one hooking lever, which is movable relative to the base plate and is configured to selectively engage/disengage with a respective fixed component of the elevator equipment according to the position taken by the coupling blades;
  - wherein the movable pins are configured to fit into respective slots on the coupling blades;
  - wherein at least one part of the slots is provided with a plurality of teeth which extend inside the respective slot, in such a way that said slot has a sawtooth shape to define a plurality of discrete seats into which respective movable pins may be introduced, thereby providing the coupling blades with a corresponding plurality of different mounting configurations relative to the articulated levers;
  - wherein each slot is oriented along an extension direction (D) which is oblique relatively to both a substantially vertical direction (Y), which coincides with the extension direction of the corresponding coupling blade, and a substantially horizontal direction (X), which is perpendicular to the substantially vertical direction (Y);

wherein the extension direction (D) of each slot is inclined at 45° relative to both said substantially vertical direction (Y) and said substantially horizontal direction (X); and wherein each coupling blade is provided with one or more pairs of slots parallel to each other, each pair of slots being configured to accommodate the same movable pin in the different mounting configurations of said coupling blades relative to said articulated lever.

2. The assembly according to claim 1, wherein said discrete seats of each respective slot are spaced apart from each other at a pitch of 1.5 mm.

3. The assembly according to claim 1, wherein said fastening system comprises:

a first plurality of circular through holes in said guide element;

a second plurality of circular through holes in said base plate; and a plurality of fasteners, wherein each fastener is configured to be inserted into one single hole of said first plurality of circular through holes and into a corresponding single hole of said second plurality of circular through holes; and wherein both the holes of said first plurality of circular through holes and the holes of said second plurality of circular through holes are respectively spaced apart from each other at a predefined pitch.

4. The assembly according to claim 3, wherein the holes of said first plurality of circular through holes are arranged in at least three rows (R1, R2, R3) which are parallel to each other and oriented along a substantially horizontal direction (X).

5. The assembly according to claim 4, wherein said rows comprise an upper row (R1) and a pair of lower rows (R2, R3), wherein the holes that are arranged in the same lower row (R2, R3) are spaced apart from each other at a pitch of about 10 mm along the substantially horizontal direction (X), and wherein the holes that are arranged in a first lower row are staggered by 5 mm, again along the said substantially horizontal direction (X), relative to the holes that are arranged in a second lower row.

6. The assembly according to claim 4, wherein said fastening system further comprises a plurality of elliptical through holes obtained on said base plate, and wherein said elliptical through holes overlap with the holes of said first plurality of circular through holes that are arranged in said upper row (R1) when said coupling and locking device is mounted on said guide element.

7. The assembly according to claim 6, wherein said coupling blades are constructed to have one of three different profiles (P1, P2, P3), and wherein each profile (P1, P2, P3) of the coupling blade differs from the other profiles (P1, P2, P3) in at least one of the following technical features:

the length of the coupling blade along the respective extension direction (Y);

the number of the respective slots;

the position of the respective slots; and the width of the coupling blade along a direction (X) perpendicular to the respective extension direction.

8. The assembly according to claim 1, wherein each coupling blade is provided with one or more pairs of slots parallel to each other, each pair of slots being configured to accommodate the same movable pin in the different mounting configurations of said coupling blades relative to said articulated lever.

9. The assembly according to claim 1, wherein said coupling blades are constructed to have one of three different profiles (P1, P2, P3), and wherein each profile (P1, P2, P3) of the coupling blade differs from the other profiles (P1, P2, P3) in at least one of the following technical features:

the length of the coupling blade along the respective extension direction (Y);

the number of the respective slots;

the position of the respective slots; and the width of the coupling blade along a direction (X) perpendicular to the respective extension direction.

* * * * *